(12) United States Patent
Patterson et al.

(10) Patent No.: US 10,007,676 B2
(45) Date of Patent: Jun. 26, 2018

(54) GEOSPATIAL SMOOTHING IN WEB APPLICATIONS

(71) Applicant: Accenture Global Services Limited, Dublin (IE)

(72) Inventors: Joshua Patterson, San Jose, CA (US); Nathan Shetterley, San Francisco, CA (US); Shan Lu, San Jose, CA (US); Brad H. Ruderman, San Francisco, CA (US)

(73) Assignee: Accenture Global Services Limited, Dublin (IE)

( * ) Notice: Subject to any disclaimer, the term of this patent is extended or adjusted under 35 U.S.C. 154(b) by 152 days.

(21) Appl. No.: 14/223,312

(22) Filed: Mar. 24, 2014

(65) Prior Publication Data
US 2014/0289284 A1 Sep. 25, 2014

Related U.S. Application Data

(60) Provisional application No. 61/804,446, filed on Mar. 22, 2013.

(51) Int. Cl.
*G06F 17/30* (2006.01)
*G09B 29/10* (2006.01)
*G06T 17/05* (2011.01)

(52) U.S. Cl.
CPC .. *G06F 17/30241* (2013.01); *G06F 17/30905* (2013.01); *G06T 17/05* (2013.01); *G09B 29/106* (2013.01)

(58) Field of Classification Search
CPC ......... G06F 17/30241; G06F 17/30905; G09B 29/106; G06T 17/05
See application file for complete search history.

(56) References Cited

U.S. PATENT DOCUMENTS

5,164,904 A * 11/1992 Sumner ............... G08G 1/0104
340/905
6,088,064 A 7/2000 Rumreich et al.
(Continued)

OTHER PUBLICATIONS

Geyer, Charles J. "5601 Notes: Smoothing." Statistics 5601 (Geyer, Fall 2013) Course Notes. Dec. 4, 2013. Web. Accessed Mar. 22, 2016 from <http://www.stat.umn.edu/geyer/5601/notes/smoo.pdf>.*

(Continued)

*Primary Examiner* — Robert W Beausoliel, Jr.
*Assistant Examiner* — Arthur Ganger
(74) *Attorney, Agent, or Firm* — Brinks Gilson & Lione (57) ABSTRACT

A system acquires geocoded data, smoothes the geocoded data, and displays the smoothed geocoded data in a graphical visualization representative of the physical locations of the acquired geocoded data. The system obtains an indication of operational parameters for smoothing geocoded data, such as a data precision level, viewing window, data characteristics, and smoothing parameters. The system generates an area map that includes entries for each location in the viewing window (or other predetermined area) according to the data precision level. The system may populate any entries without associated data values with a zero value. To process the geocoded data, the system may determine a vector of interest from the area map and generate, for example, a single smoothing matrix that smoothes each of the values in the vector of interest. The system applies the smoothing matrix to the vector of interest.

19 Claims, 4 Drawing Sheets

(56) References Cited

U.S. PATENT DOCUMENTS

| | | | |
|---|---|---|---|
| 6,272,501 B1* | 8/2001 | Baumann | G06F 17/30241 |
| 9,514,522 B2* | 12/2016 | Fu | H04N 13/0022 |
| 2003/0135304 A1* | 7/2003 | Sroub | G06Q 10/08 |
| | | | 701/1 |
| 2006/0170693 A1* | 8/2006 | Bethune | G06T 3/40 |
| | | | 345/568 |
| 2007/0143796 A1 | 6/2007 | Malik | |
| 2007/0279494 A1 | 12/2007 | Aman et al. | |
| 2008/0019603 A1 | 1/2008 | Rahmes et al. | |
| 2008/0091757 A1* | 4/2008 | Ingrassia | G06T 11/001 |
| | | | 708/490 |
| 2009/0085915 A1 | 4/2009 | Kelley et al. | |
| 2010/0069035 A1 | 3/2010 | Johnson | |
| 2010/0100307 A1* | 4/2010 | Kim | G01S 5/0027 |
| | | | 701/119 |
| 2011/0013087 A1 | 1/2011 | House et al. | |
| 2011/0141136 A1* | 6/2011 | Cardno | G06T 11/206 |
| | | | 345/606 |
| 2011/0261049 A1* | 10/2011 | Cardno | G06Q 10/10 |
| | | | 345/419 |
| 2012/0094639 A1 | 4/2012 | Carlson et al. | |
| 2012/0179432 A1* | 7/2012 | Wivell | G06T 11/001 |
| | | | 703/2 |
| 2012/0278752 A1* | 11/2012 | Parker | G06F 3/0488 |
| | | | 715/780 |
| 2013/0332056 A1* | 12/2013 | Huang | G08G 1/0112 |
| | | | 701/117 |
| 2014/0195019 A1 | 7/2014 | Thurman et al. | |
| 2015/0154403 A1* | 6/2015 | Dornbush | A63B 24/0062 |
| | | | 700/91 |
| 2015/0379767 A1* | 12/2015 | Inoue | G06T 17/05 |
| | | | 382/154 |

OTHER PUBLICATIONS

Environmental Systems Research Institute, Inc. "ArcGIS Desktop Help 9.3—How Aggregate Works." ArcGIS Desktop Help 9.3—How Aggregate Works. Environmental Systems Research Institute, Inc., Sep. 7, 2011. Accessed Oct. 26, 2016 from <http://webhelp.esri.com/arcgisdesktop/9.3/index.cfm?TopicName=How%2BAggregate%2Bworks>.*

Hoaglin, David C., and Roy E. Welsch. "The Hat Matrix in Regression and ANOVA." The American Statistician 32.1 (1978): 17-22. Accessed Oct. 26, 2016 from <http://www.stat.ucla.edu/~cocteau/stat201b/handout/hat.pdf>.*

Nykjaer, Kunuk. "Clustering—Grid Cluster with C# and Html-canvas Example (part 1)." Software Programming. Sep. 17, 2011. Accessed May 19, 2017 from <https://kunuk.wordpress.com/2011/09/15/clustering-grid-cluster/>.*

Dempsey, Caitlin. "Twitter Map of the Last One Million Tweets—GIS Lounge." GIS Lounge. Jul. 11, 2013. Accessed May 22, 2017 from <https://www.gislounge.com/twitter-map-last-one-million-tweets/>.*

Kam, Tin Seong et al. DIVAD: A Dynamic and Interactive Visual Analytical Dashboard for Exploring and Analyzing Transport Data. (2012). International Journal of Computer, Electrical, Automation, Control and Information Engineering. 6, (11), 834-1353. Available at: http://ink.library.smu.edu.sg/sis_research/1761.*

Rodríguez, Germán. "Smoothing and Non-Parametric Regression." Demographic Methods (2014): Published Spring 2001. Web. Accessed Mar. 24, 2016 from <http://data.princeton.edu/eco572/smoothing.pdf>.*

International Search Report and Written Opinion for corresponding PCT International Application No. PCT/US2014/031600 dated Sep. 4, 2014 (5 pages)

"Smoothing," Wikipedia, the Free Encyclopedia, https://en.wikipedia.org/wiki/Smoothing, printed on Jun. 29, 2016, 3 pp.

Patent Examination Report No. 1 dated May 30, 2016 for Australia Patent Application No. 2014-235873 (4 pgs.).

"Aggregating data to grid cells", SpatialPython, whole document [retrieved from internet on Sep. 27, 2015], http://web.archive.org/web/20100205102222/http://sites.google.com/site/spatialpython/aggregating-data-to-grid-cells> published on Feb. 5, 2012 as per Wayback Machine.

Buja, A. et al. "Linear Smoothers and Additive Models", The Annals of Statistics, Jun. 1989, vol. 17, No. 2, pp. 453-510.

Examination Report No. 2 issued in corresponding Australian application serial No. 2014235873, dated Oct. 13, 2016, 5 pages.

Patent Examination Report No. 1 dated Oct. 17, 2016 for Australian Patent Application No. 2016219607 (7 pp.).

Patent Examination Report No. 1 dated Sep. 22, 2016 for Australian Patent Application No. 2016206330 (5 pp.).

Beshai, Peter, "Buckets: Basketball Shot Visualization," University of British Columbia, published Dec. 2014, https://www.cs.ubc.ca/~tmm/courses/54714/projects/peter/report.pdf (19 pp.).

"Football Matchday Widget Showcase," Opta Sports, https://web.archive.org/web/20130901042706/http://www.optasports.com/football-matchday-widget-showcase.aspx (4 pp).

Knutson, Ted, "Visualizing Eden Hazard," https://thechels.co.uk/4717-visualizing-eden-hazard/, Feb. 2, 2014 (6 pp.).

"2012 Matrix," Opta Sports, https://web.archive.org/web/20130420075948/http://www.optasports.com/ImageGen.ashx?image=/media/456902/media.jpg&width=646&height=294 (1 pp.).

Patent Examination Report No. 3 from corresponding Australian patent application No. 2014235873 dated Mar. 7, 2017 (4 pages).

"Smoothing"—Wikipedia, the free encyclopedia, http://web.archive.org/web/20120917190142/https://en.wikipedia.org/wiki/Smoothing, published on Sep. 17, 2012 as per Wayback Machine (2 pages).

"Aggregating Data to Grid Cells", Spatial Python, http://web.archive.org/web/20100205101222/http://sites.google.com/site/spatialpython/aggregating-data-to-grid-cells, published on Feb. 5, 2012 as per Wayback Machine (8 pages).

Buja, Andreas et al., "Linear Smoothing and Additive Models", The Annals of Statistics, Jun. 1989, vol. 17, No. 2, pp. 453-510 (58 pages).

Patent Examination Report No. 4 from corresponding Australian patent application No. 2014235873 dated May 22, 2017 (5 pages).

Office Action dated Mar. 31, 2017 for Canadian Patent Application No. 2,937,093 (4 pages).

Australian Patent Office, Examination Report No. 1 for Australian Patent Application No. 2017203553 dated Mar. 15, 2018, pp. 1-4.

* cited by examiner

GEOSPATIAL SMOOTHING IN WEB APPLICATIONS

1. PRIORITY CLAIM

This application claims the benefit of priority to provisional application Ser. No. 61/804,446, filed Mar. 22, 2013, which is incorporated by reference in its entirety.

2. FIELD OF THE INVENTION

This disclosure relates to the acquisition, processing and display of geocoded data. This disclosure also relates to smoothing the geocoded data.

3. DESCRIPTION OF RELATED ART

Rapid advances in technology have resulted in computing devices with continually increasing data processing capability. Although modern computing devices can process immense amounts of data, which can include data across different time frames, for different geographical points, or delineated according to any number of data characteristics, the amount of data available to be processed is even greater and places increased loads on modern computing devices. As the amount of data gathered by computational devices increases, there is an increasing incentive to process data more efficiently.

BRIEF DESCRIPTION OF THE DRAWINGS

The innovation may be better understood with reference to the following drawings and description. In the figures, like reference numerals designate corresponding parts throughout the different views.

DETAILED DESCRIPTION

This discussion below refers to the acquisition, processing and display of geocoded data. Geocoded data may refer to any data that includes location data, has a locational aspect, or is associated with a physical location. Geocoded data may be associated with any type of location data, including Global Position System (GPS) data, latitude and longitude coordinate data, and countless additional examples. The geocoded data may include traffic data, identifying locations in a city's street system where a vehicular accident has occurred, levels of traffic, traffic light states, or other traffic-related data, either in real-time or over a moving average of time. Geocoded data may be used in smart grid applications for tracking or specifying wattage distribution, power fluctuations, or other power characteristics in a viewed area (e.g., a particular zip code, a city block, or on a per-power meter basis). Geocoded data may be utilized in countless other applications.

Additional examples include use of geocoded data by telecommunication providers to track reception or usage at different base stations, by an Internet Service Provider (ISP) to track download latency, upload latency, network traffic, error rate, noise levels, quality of service, or other data characteristics at different physical positions in a communication network, or for tracking different events that occur at different points in a basketball court (e.g., made shots, missed shots, turnovers, rebounds, etc.) by a particular player, set of players, or team and for a particular time period (e.g., during a current game, over the past 10 games, in the first quarter of games in the past 2 seasons, etc.). The methods, systems, and logic described herein provide efficient processing of geocoded data, which means faster processing time, less consumption of system resources, and more efficient use of system memory.

As one exemplary implementation, a system may include a memory storing geocoded data, a display, and circuitry communication with the memory and the display. The circuitry may be configured to access the geocoded data from the memory; obtain a data precision level for processing the geocoded data; aggregate the geocoded data for a location according to the data precision level; and process the geocoded data according to the data precision level. The circuitry may process the geocoded data according to the data precision level by generating an area map according to the data precision level; joining the aggregated geocoded data to the area map to obtain a populated area map; generating a matrix including data that accounts for each location in the area map; smoothing the data in the matrix to generate a smoothing matrix; and applying the smoothing matrix to the area map. The circuitry may also cause the display to present the processed geocoded data.

In the exemplary implementation, the circuitry may be configured to process the geocoded data by ensuring the populated area map includes a value for each location in the populated area map, and the ensuring may include identifying a particular location in the populated area map without an associated value and populating the particular location with a zero value. In some variations, the circuitry may be configured to generate the matrix further according to one or more smoothing parameters. As another example variation, the circuitry may be configured to access the geocoded data by accessing a specific portion of the geocoded data corresponding to one or more display parameters, where the display parameters comprise a user specified display parameter, a preconfigured display parameter, or both.

The circuitry of the system may, for example, process the geocoded data according to the data precision level by extracting a vector of interest from the area map and apply the smoothing matrix to the area map by applying the smoothing matrix to the vector of interest. For instance, the circuitry may perform performing a matrix multiplication operation with the vector of interest and the smoothing matrix. The circuitry may generate the matrix by determining the dimensions of the matrix to have a height and a width equal to a number of values stored in the vector of interest. As another option, the circuitry may generate the matrix by determining dimensions of the matrix to have a height, a width, or both, equal to a number of locations in the area map. As yet another option, the circuitry may be configured to process the geocoded data according to the data precision level by generating the area map and the matrix with a same order.

In another exemplary implementation, a method may include accessing geocoded data from a memory; obtaining a data precision level for processing the geocoded data; aggregating the geocoded data for a location according to the data precision level; and processing, with circuitry comprising a processor, the geocoded data according to the data precision level. Processing the geocoded data according to the data precision level may include generating, with the processor, an area map according to the data precision level; joining, with the processor, the aggregated geocoded data to the area map to obtain a populated area map; generating, with the processor, a matrix including data that accounts for each location in the area map; smoothing, with the processor, the data in the matrix to generate a smoothing matrix; and applying, with the processor, the smoothing matrix to the area map. The method may also include presenting the processed geocoded data for display on an output device.

In the exemplary method implementation, processing the geocoded data with the circuitry may include ensuring, with the processor, the populated area map includes a value for each location in the populated area map. And ensuring may include identifying, with the processor, a particular location in the populated area map without an associated value and populating, with the processor, the particular location with a zero value. In some variations, accessing geocoded data may include accessing, with the processor, a specific portion of the geocoded data corresponding to one or more display parameters, where the display parameters comprise a user specified display parameter, a preconfigured display parameter, or both. In some variations, generating the area map comprises representing, with the processor, the area map as a vector of interest, and where applying the smoothing matrix to the area map may include applying, with the processor, the smoothing matrix to the vector of interest.

In another exemplary implementation, a product may include a non-transitory computer readable medium comprising instructions, that when executed by a processor, cause the processor to access geocoded data; obtain a data precision level for processing the geocoded data; aggregate the geocoded data for a location according to the data precision level; and process the geocoded data according to the data precision level. The instructions may cause the processor to process the geocoded data by generating an area map according to the data precision level; joining the aggregated geocoded data to the area map to obtain a populated area map; generating a matrix including data that accounts for each location in the area map; smoothing the data in the matrix to generate a smoothing matrix; and applying the smoothing matrix to the area map. The instructions may also cause the processor to cause a displaying of the processed geocoded data.

In the exemplary product implementation, the instructions may further cause the processor to process the geocoded data by ensuring the populated area map includes a value for each location in the populated area map, including identifying a particular location in the populated area map without an associated value and populating the particular location with a zero value. As another variation, the instructions may cause the processor to access the geocoded data by accessing a specific portion of the geocoded data corresponding to one or more display parameters, where the display parameters comprise a user specified display parameter, a preconfigured display parameter, or both. Optionally, the instructions may further cause the processor to process the geocoded data according to the data precision level by extracting a vector of interest from the area map and apply the smoothing matrix to the area map by applying the smoothing matrix to the vector of interest. Optionally, the instructions may cause the processor to generate the matrix by determining the dimensions of the matrix to have a height, a width, or both, equal to a number of locations in the area map.

Figure 1:
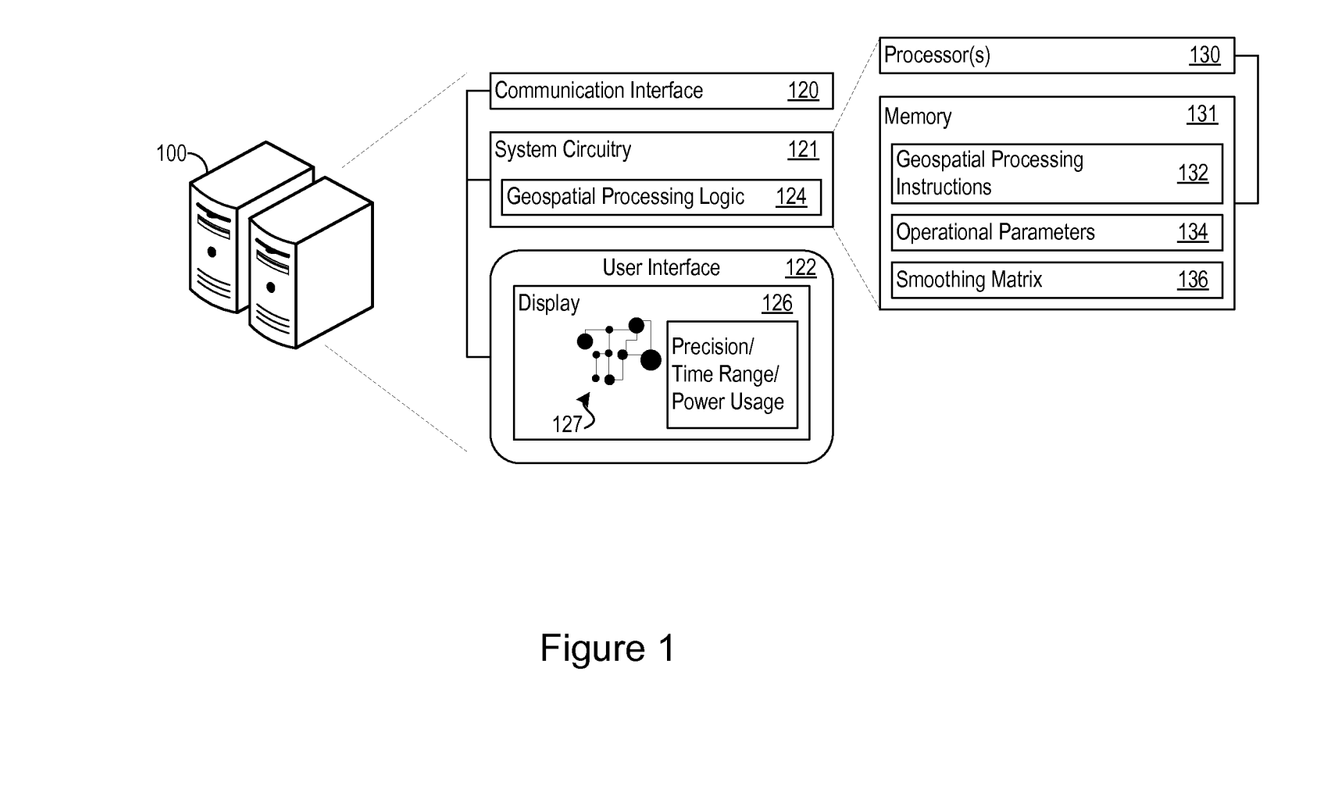
FIG. 1 shows an example of a system for processing geocoded data.

FIG. 1 shows an example of a system 100 for processing geocoded data. The system 100 may include a communication interface 120, system circuitry 121, and a user interface 122. The communication interface 120 may support communication across any number of networks and according to any number communication standards, protocols, methods, topologies, or configurations. In that regard, the communication interface 120 may support communication according to various quality-of-service (QoS) techniques, encoding formats, through various physical (PHY) interfaces, and more. For example, the communication interface 120 may communicate according to any of the following network technologies, topologies, mediums, protocols, or standards: Ethernet including Industrial Ethernet, any open or proprietary industrial communication protocols, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, Universal Mobile Telecommunications System (UMTS), GSM® Association, Long Term Evolution (LTE)™, or more), WiFi (including 802.11 a/b/g/n/ac), WiMAX, Bluetooth, WiGig (e.g., 802.11ad), and any other wired or wireless technology or protocol.

The system circuitry 121 may implement any of the processing performed by the system 100 in hardware, firmware, software, or any combination thereof. In some implementations, the system circuitry 121 includes geospatial processing logic 124. As discussed in greater detail below, the geospatial processing logic 124 may access and process geocoded data.

The user interface 122 may include a display 126 through which the system 100 displays processed geocoded data. The system 100 may present processed geocoded data through a dashboard 127, for example. The dashboard 127 may provide a visualization of processed geocoded data as well as any number of display parameters or processing parameters. Examples of such parameters include a data precision level, a time range, characteristics of the data, or other parameters. In the example shown in FIG. 1, the system 100 presents a dashboard 127 showing power usage over a city grid on a per city-block basis, representing power usage as varying sized circles in the dashboard 127. Any number of visualization techniques for displaying geocoded data are contemplated herein, including mapping of discrete locations and their associated value for a particular data type, colored displays, heat maps, charts, graphs, and more.

In some implementations, the system circuitry 121 includes one or more processors 130 and a memory 131. The memory 131 may store geospatial processing instructions 132 and operational parameters 134. The processors 130 execute the geospatial processing instructions 132 to access and process geocoded data according to the operational parameters 134. The operational parameters 134 may include processing parameters affecting how geocoded data is processed by the geospatial processing logic 124 and/or display parameters that determine what geocoded data to process and how processed geocoded data is displayed. The memory 131 may also store a smoothing matrix 136, which the geospatial processing logic 124 may utilize to process geocoded data.

Figure 2:
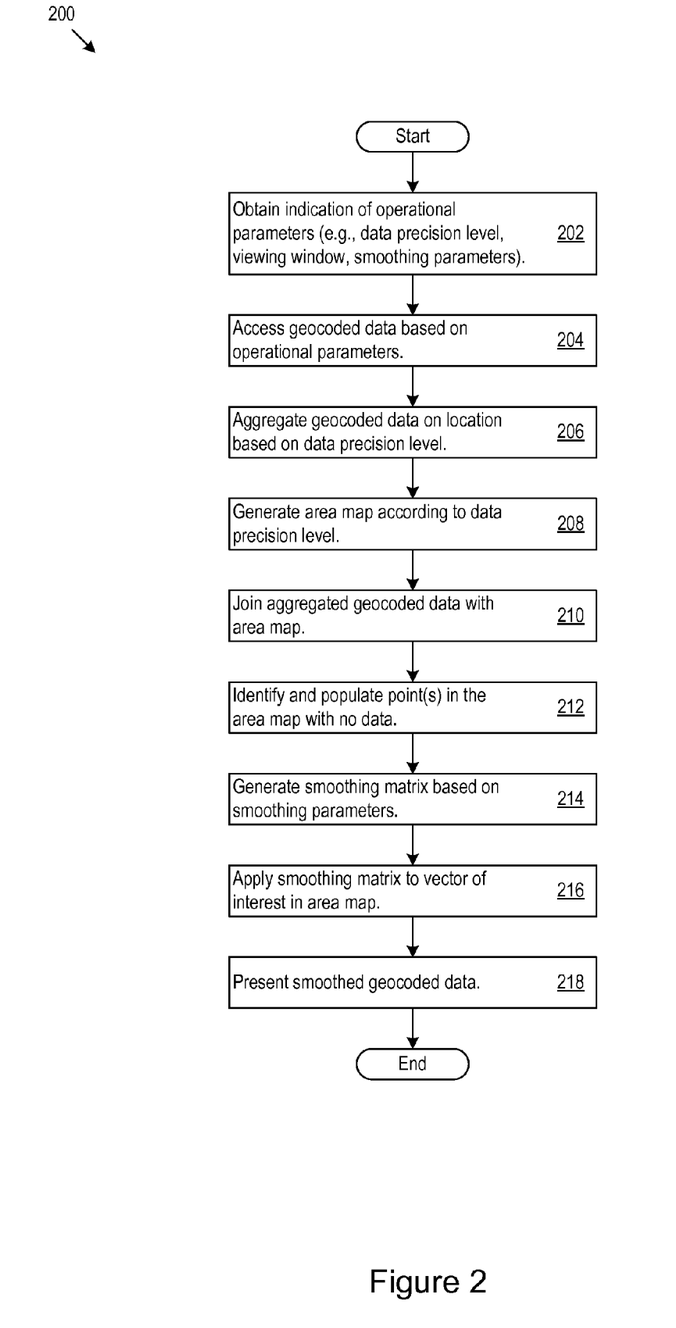
FIG. 2 shows an example of logic that may be implemented in hardware, firmware, software, or any combination thereof.

One example of processing of geocoded data is presented next in FIG. 2. Specifically, the following example describes how the geospatial processing logic 124 may smooth geocoded data. However, the geospatial processing logic 124 may process geocoded data according to any number or combination of processing, transformation, or analysis techniques in a consistent manner as described herein.

FIG. 2 shows an example of logic 200 that may be implemented in hardware, firmware, software, or any combination thereof. For example, the geospatial processing logic 124 may implement the logic 200 in software as the geospatial processing instructions 132.

The geospatial processing logic 124 may obtain an indication of the operational parameters 134 for processing and/or presenting geocoded data (See element 202 in FIG. 2). Some, none, or all of the operational parameters 134 may be preconfigured and stored in the memory 131, and the geospatial processing logic 124 may access these operational parameters 134 through the memory 131. As another example, the geospatial processing logic 124 may receive some, none or all of the operational parameters 134 for processing and displaying geocoded data through the user interface 122. In that regard, the geospatial processing logic 124 may dynamically access and process geocoded data according to the desired specifications and parameters requested by a user, for example.

The operational parameters 134 may include a data precision level. Data precision level may refer to any indication of a level of granularity for aggregating, processing, analyzing, or displaying geocoded data. For example, the geospatial processing logic 124 may aggregate, analyze, and/or process, geocoded data for an area (or area map) within the range of 5 cm$^2$ (about the size of a postage stamp) to 510 Mm$^2$ (the surface area of the earth), an area within the range of 0.1 m$^2$ to 30 Mm$^2$, an area within the range of 0.125 m$^2$ to 10 Mm$^2$ or an area of arbitrary size. The data precision level used to aggregate, analyze, and/or process, geocoded data may specify that the area is divided into a certain number of regions (e.g., locations). In some implementations, the area may be divided into 10 regions, 100 regions, or 1000 regions, or a number of regions between 1 and 10$^{10}$, as just some examples.

In an example of accessing and processing geocoded data for a smart grid, the geospatial processing logic 124 may aggregate, analyze, process, or display geocoded smart grid data with a data precision level of a per-zip code precision level, per-city block precision level, per-building precision level, or a per-meter precision level, as examples of increasing granularity and resolution. In a different example relating to accessing and processing geocoded data for basketball statistics, the geospatial processing logic 124 may aggregate, analyze, process, or display geocoded basketball statistics data for a 50 ft. (15.2 m)×47 ft. (14.3 m) half court area on a per-region precision level (e.g., as divided according to any predetermined division), on a per-meter precision level, on a per-foot precision level, on a per-inch precision level, on a per-centimeter precision level, or on any other unit precision level.

The finer grain the data precision level, the greater number of points or locations in a particular area the geospatial processing logic 124 may process. Continuing a basketball statistics example, when the data precision level specifies analyzing and processing geocoded basketball statistics data on a per-region level where the 50 ft. (15.2 m)×47 ft. (14.3 m) court area is divided into 10 different regions, the geospatial processing logic 124 may process, e.g., smooth, 10 different data sets, e.g., one corresponding to each region. When the data precision level is on a foot-by-foot precision level, the geospatial processing logic 124 may process 2,350 different sets of data, i.e., (50*47) different data sets. When the data precision level is an inch precision level, the geospatial processing logic 124 may process 338,400 different data sets, i.e., (50*12)*(47*12) different data sets, one for each square inch in the 50 ft.×47 ft. half court. Accordingly, the geospatial processing logic 124 may process geocoded data according to varying data precision levels.

The operational parameters 134 may include a viewing window, which may refer to a particular window of data to present through the user interface 122. In some implementations, the geospatial processing logic 124 may determine, access, or extract a particular portion of a set of geocoded data to process and display based on the viewing window.

The operational parameters 134 may include a time frame, which may refer to a particular time period associated with geocoded data. The time frame may be a single point in time or a period of time. The geospatial processing logic 124 may access and process a particular portion of a set of geocoded data based on the time frame. The operational parameters 134 may also include any additional parameters specifying a particular portion of geocoded data to access and process. In that regard, the operational parameters 134 may include any filtering criteria for use when accessing geocoded data.

The operational parameters 134 may also include any number of processing parameters. As one example, the operational parameters 134 may include one or more smoothing parameters that the geospatial processing logic 124 may employ to smooth geocoded data. The smoothing parameters may include a smoothing order which may indicate a number of or which particular (e.g., neighboring) locations to account for when performing a smoothing process, configurable weights for neighboring locations of a current location being smoothed, etc. The smoothing parameters may apply any function to the geocoded data such as through smoothing values in the area map that account for neighboring location values, e.g., as weighted average of selected locations surrounding a particular location. As discussed below, the geospatial processing logic 124 may use the smoothing parameters to generate a smoothing matrix 136.

The geospatial processing logic 124 may access geocoded data based on the operational parameters 134 (see element 204 in FIG. 2). In one example, the geospatial processing logic 124 accesses one or more databases storing geocoded data. The geospatial processing logic 124 may extract geocoded data according to the operational parameters 134. For example, the geospatial processing logic 124 may extract geocoded data that corresponds to a particular time frame, viewing window, displayable area (even if it exceeds a viewing window), relevant area, associated with a particular data characteristic, attributed to a particular person, unit, or other entity, or according to any other configurable or user-specified filtering criteria.

The geospatial processing logic 124 may access some or all of the geocoded data for a particular location. The geospatial processing logic 124 may access multiple sets of data related to the geocoded data (e.g., rebounding data, shot data, turnover data, and other sets for geocoded basketball statistics data). For instance and with respect to the above geocoded basketball statistics data example, a user may request viewing rebound locations for a particular basketball player in a particular game. The geospatial processing logic 124 may access some or all of the geocoded data for the particular basketball player in the particular game, including the rebounding statistical data for the player and optionally additional data, such as shots data for the player (e.g., made, missed, total, percentage, etc.), turnover data for the player, or any other data with respect to the particular player for that particular game. The geospatial processing logic 124 may access additional geocoded data associated with any of the operational parameters 134 or filtering criteria (e.g., additional time period, any additional data values for a particular position, etc.). By accessing and processing the additional geocoded data, the geospatial processing logic 124 may efficiently support immediate, real-time, or near-instantaneous toggling between different views of data.

The geospatial logic 124 may aggregate geocoded data for a location based on the data precision level (see element 206 in FIG. 2). That is, when the accessed geocoded data is of a higher (e.g., finer grained) precision level than the data precision level specified by the operational parameters 134, the geospatial processing logic 124 may aggregate geocoded data at the specified data precision level. To illustrate, one or more databases may store geocoded basketball statistics data on a per-inch data precision level, whereas the operational parameters 134 as requested by user may specify a per-foot data precision level. In this illustration, the geospatial processing logic 124 may aggregate (e.g., sum) any relevant geocoded corresponding to a particular location at the per-foot data precision level by the operational parameters 134 (e.g., aggregate all inch-level data corresponding to a particular square foot location of the court).

The geospatial processing logic 124 may generate an area map according to the data precision level specified by the operational parameters 134 (see element 208 in FIG. 2). An area map may refer to a visual data representation that includes all locations in a particular area. The particular area may refer to a viewing window specified by a user, a predetermined area (e.g., the 50 ft.×47 ft. area of a basketball half court), a maximum, preferred, or optimal display area supported by a user interface 122 for a particular type of geocoded data, or according to any other area determination factors. The area map may include a number of locations (or entries associated with a location) as specified by the data precision level. For example, for a per-foot precision level for geocoded basketball statistics data, the geospatial processing logic 124 may generate an area map with 2,350 locations that correspond to each square foot in the half court area. The geospatial processing logic 124 may implement the area map in any suitable data representation or data object, e.g., as a matrix, linked list, array, one or more vectors, or in any other way.

The geospatial processing logic 124 may join the aggregated geocoded data with the area map (see element 210 in FIG. 2). In that regard, the geospatial processing logic 124 may populate the area map with the corresponding data values of the geocoded data. In some implementations, each location of the area map stores associated data values for that particular location (e.g., number of rebounds obtained by a player a particular square foot location, number of shots taken, made, and missed by the particular player at the particular square foot location, etc.).

Continuing, the geospatial processing logic 124 may ensure the area map is completely populated. To do so, the geospatial processing logic 124 may identify and populate any points (e.g., locations or location entries) in the area map without any data values or without a data value for a particular set of data (see element 212 in FIG. 2). For example, the geocoded data extracted by the geospatial processing logic 124 may lack rebound data for a particular player at a particular location in a basketball half court. In this case, the geospatial processing logic 124 may add, as one example, a '0' value for the rebounding data at the particular location of the area map. Doing so may support efficient smoothing processing as described below.

The geospatial processing logic 124 may generate a smoothing matrix 136 (see element 214 in FIG. 2). The geospatial processing logic 124 may generate a single smoothing matrix 136 that may be applied to the area map as a whole. For example, the geospatial processing logic 124 may generate the smoothing matrix 136 such that it accounts for each location in an area map, e.g., applying the smoothing matrix 136 processes each location in the area map. Also, the geospatial processing logic 124 may generate the area map and smoothing matrix to share the same order. In some implementations, the geospatial processing logic 124 may generate an area map as a set of vectors and represent data values for a particular data type (e.g., rebound data, shot data, etc.) as a particular vector, where each position in the vector corresponds to a particular location of the area map. The geospatial processing logic 124 may generate the smoothing matrix 136 based on a data precision level specified by the operational parameters 134 and/or the dimensions and size of the area map (which may also depend on the data precision level).

As one example, the geospatial processing logic 124 may generate an area map representing a 3×3 area, with locations in the 3×3 area numbered from 0-8. The geospatial processing logic 124 may generate the following vector for a particular data type associated with the area ("vector of interest"), where $V_0$-$V_8$ represent respective values of the particular data type for locations 0-8 of the area map:

Vector={$V_0$; $V_1$; $V_2$; $V_3$; $V_4$; $V_5$; $V_6$; $V_7$; $V_8$}

Thus, the vector of interest may refer to a data structure in vector form for the data values in an area map of a particular data type. For a vector of interest, the geospatial processing logic 124 may generate a smoothing matrix 136 of the same order and that accounts for each of the values in the vector of interest. For example, the geospatial processing logic 124 may generate a smoothing matrix with a matrix height equal to the number of entries in the vector of interest as well as a matrix width equal to the number of entries in the vector of interest. Accordingly, for the exemplary vector of interest above with 9 values, the geospatial processing logic 124 may generate a 9×9 smoothing matrix 136, e.g., as follows in Table 1:

TABLE 1

9 × 9 Smoothing Matrix

| | | | | | | | | |
|---|---|---|---|---|---|---|---|---|
| $V_{(0,0)}$ | $V_{(1,0)}$ | $V_{(2,0)}$ | $V_{(3,0)}$ | $V_{(4,0)}$ | $V_{(5,0)}$ | $V_{(6,0)}$ | $V_{(7,0)}$ | $V_{(8,0)}$ |
| $V_{(0,1)}$ | $V_{(1,1)}$ | $V_{(2,1)}$ | $V_{(3,1)}$ | $V_{(4,1)}$ | $V_{(5,1)}$ | $V_{(6,1)}$ | $V_{(7,1)}$ | $V_{(8,1)}$ |
| $V_{(0,2)}$ | $V_{(1,2)}$ | $V_{(2,2)}$ | $V_{(3,2)}$ | $V_{(4,2)}$ | $V_{(5,2)}$ | $V_{(6,2)}$ | $V_{(7,2)}$ | $V_{(8,2)}$ |
| $V_{(0,3)}$ | $V_{(1,3)}$ | $V_{(2,3)}$ | $V_{(3,3)}$ | $V_{(4,3)}$ | $V_{(5,3)}$ | $V_{(6,3)}$ | $V_{(7,3)}$ | $V_{(8,3)}$ |
| $V_{(0,4)}$ | $V_{(1,4)}$ | $V_{(2,4)}$ | $V_{(3,4)}$ | $V_{(4,4)}$ | $V_{(5,4)}$ | $V_{(6,4)}$ | $V_{(7,4)}$ | $V_{(8,4)}$ |
| $V_{(0,5)}$ | $V_{(1,5)}$ | $V_{(2,5)}$ | $V_{(3,5)}$ | $V_{(4,5)}$ | $V_{(5,5)}$ | $V_{(6,5)}$ | $V_{(7,5)}$ | $V_{(8,5)}$ |
| $V_{(0,6)}$ | $V_{(1,6)}$ | $V_{(2,6)}$ | $V_{(3,6)}$ | $V_{(4,6)}$ | $V_{(5,6)}$ | $V_{(6,6)}$ | $V_{(7,6)}$ | $V_{(8,6)}$ |
| $V_{(0,7)}$ | $V_{(1,7)}$ | $V_{(2,7)}$ | $V_{(3,7)}$ | $V_{(4,7)}$ | $V_{(5,7)}$ | $V_{(6,7)}$ | $V_{(7,7)}$ | $V_{(8,7)}$ |
| $V_{(0,8)}$ | $V_{(1,8)}$ | $V_{(2,8)}$ | $V_{(3,8)}$ | $V_{(4,8)}$ | $V_{(5,8)}$ | $V_{(6,8)}$ | $V_{(7,8)}$ | $V_{(8,8)}$ |

A particular portion of the smoothing matrix 136 may correspond to a particular value of the vector of interest. For example, the first column of the 9×9 smoothing matrix 136 (column of values $V_{(0,0)}$-$V_{(0,8)}$) may be associated with the processing of (e.g., include smoothing weights) for $V_0$. Each entry in the column may specify, for example, a weight applied to a corresponding value in the vector of interest when determining a smoothed value for $V_0$. The geospatial processing logic 124 may determine the values for each entry of the smoothing matrix 136 based on the smoothing parameters, which may include any number of smoothing parameters as specified by the user.

As noted above, the smoothing parameters may apply any function to values in the area map or vector of interest. Thus, the geospatial processing logic 124 may populate the smoothing matrix 136 to apply a weighted function to any of the values in the vector of interest by specifying the corresponding smoothing matrix values. The smoothing weights may, for example, specify a weighted average that accounts for one or more neighboring locations of a current location in the area map and corresponding value in the vector of interest, e.g., the four locations directly above, to the left, to the right, and below a particular location in the area map. The smoothing parameters may apply a weighted average such that the sum of the weights applied to a particular vector of interest value sum to 1 (e.g., values $V_{(0,0)}$-$V_{(0,8)}$ applied to value $V_0$ in the vector of interest sum to 1), with the respective values providing a smoothing weight. For higher orders of smoothing (e.g., accounting for a greater number of neighboring locations or cells), the smoothing matrix 136 may include more non-zero entries. The smoothing parameters may also specifying amplifying or decreasing the weight of a particular value in the vector of interest compared to other values, e.g., when the sum of the smoothing weights for a first column applied to a first value in the vector of interest differs (e.g., is greater than or less than) than the sum of the smoothing weights for a second column applied to a second value in the vector of interest.

The geospatial processing logic 124 may also control which neighboring locations for a particular location in the area map are accounted for when smoothing the particular location by including non-zero entries in the smoothing matrix 136 in the column of the smoothing matrix 136 associated with the particular location. As an additional example, the smoothing parameters may specify a number of times a smoothing operation is applied, for example specifying apply of the smoothing matrix 136 one or more times.

The geospatial processing logic 124 may generate a single smoothing matrix 136 for a particular area map, even when the area map has a large dimension or large number of locations. For example, when the operational parameters 134 specify accessing and processing geocoded basketball statistics data on a per-inch data precision level, the area map for a 50 ft.×47 ft. half court area may include 338,400 entries, i.e., there may be one entry for each region of the area map. The geospatial processing logic 124 may generate a corresponding smoothing matrix 136 with dimensions of 338,400×338,400, thus including 112,091,040,000 entries. Accordingly, the geospatial processing logic 124 may generate a single, large smoothing matrix 136 so as to perform a smoothing process in a single operation, e.g., in a single matrix multiplication operation.

The geospatial processing logic 124 may apply the smoothing matrix 136 to the vector of interest (see element 216 in FIG. 2) to obtain processed geocoded data. In this example, the smoothing matrix 136 effectuates a smoothing operation on the values in the vector of interest, according to the smoothing parameters specified in the operational parameters 134. As mentioned above, the geospatial processing logic 124 may perform a single matrix multiple operation to perform the smoothing process on each of the values in a vector of interest (or any other representation of an area map for a particular data type or set).

By generating a smoothing matrix 136 that applies to each value in an area map or vector of interest, the geospatial processing logic 124 may forego performing individual computations or operations to smooth the geocoded data on a location-by-location basis. That is, in other implementations, smoothing may be performed one location at a time by retrieving and weighting values for neighboring locations (determined according to smoothing parameters) and performing a smoothing function for the location based on the retrieved and weighted values of the neighboring locations. This process may be repeated for each location in the area map to be smoothed, resulting in multiple operations to smooth an entire area map (e.g., equal to the number of entries).

Thus, for a large area map of 334,800 entries, for example, a smoothing process may require 334,800 smoothing operations to individually smooth each location. Similarly, when a local smoothing matrix is applied that smoothes a particular location, numerous operations may be required to individually apply the local smoothing matrix to each location. Instead of performing multiple (e.g., 388,800) smoothing operations for a 600 inch×564 inch basketball half court area map, for example, the geospatial processing logic 124 may perform a single matrix multiple operation with a large (e.g., 112,091,040,000 entry) smoothing matrix instead. In this way, the geospatial processing logic 124 may reduce the computational strain on a computing device implementing the geospatial processing logic 124, which may result in more efficient processor utilization and reduced energy consumption power dissipation.

While the example above describes one global smoothing matrix 136 that applies to each location in an area map or vector of interest, the geospatial processing logic 124 may divide an area map or vector of interest into multiple portions, generate corresponding smoothing matrices of a respective consistent order, and apply the corresponding smoothing matrix to the portion of the area map or vector of interest in a consistent manner as described above. Then, the geospatial processing logic 124 may visually present the smoothed geocoded data (218), e.g., through a user interface 122.

By processing (e.g., smoothing) geocoded data using a lesser number of operations, the geospatial processing logic 124 may efficiently and more quickly process geocoded data as compared to individually processing or smoothing the geocoded data per location.

The geospatial processing logic 124 may dynamically access, process, and present geocoded data, e.g., in response to changing operational parameters 134 requested by a user. For example, the geospatial processing logic 124 may identify a change in any of the operational parameters 134, such as a time frame, viewing window, data precision level, smoothing parameters, type of data being viewed, or a change in any other parameter or data characteristic. In response, the geospatial processing logic 124 may perform any combination of the steps described in the logic 200 to process the data. With the increased efficiency realized through performing a reduced number of processing operations (e.g., using a single matrix multiplication operation), the geospatial processing logic 124 may support increased levels of insight and flexibility when processing and presenting processed geocoded data. Thus, the geospatial processing logic 124 may support real-time data presentation, e.g., accessing and processing of geocoded data after receiving operational parameters 134 specified by a user instead of retrieving pre-processed data according to pre-configured operational parameters 134. This may be particularly useful for time-critical displays, where processing latency that exceeds a particular threshold (e.g., 2 s) will render data less valuable or useless. Accordingly, the geospatial processing logic 124 may provide real, valuable insight in real-time.

Figure 3:
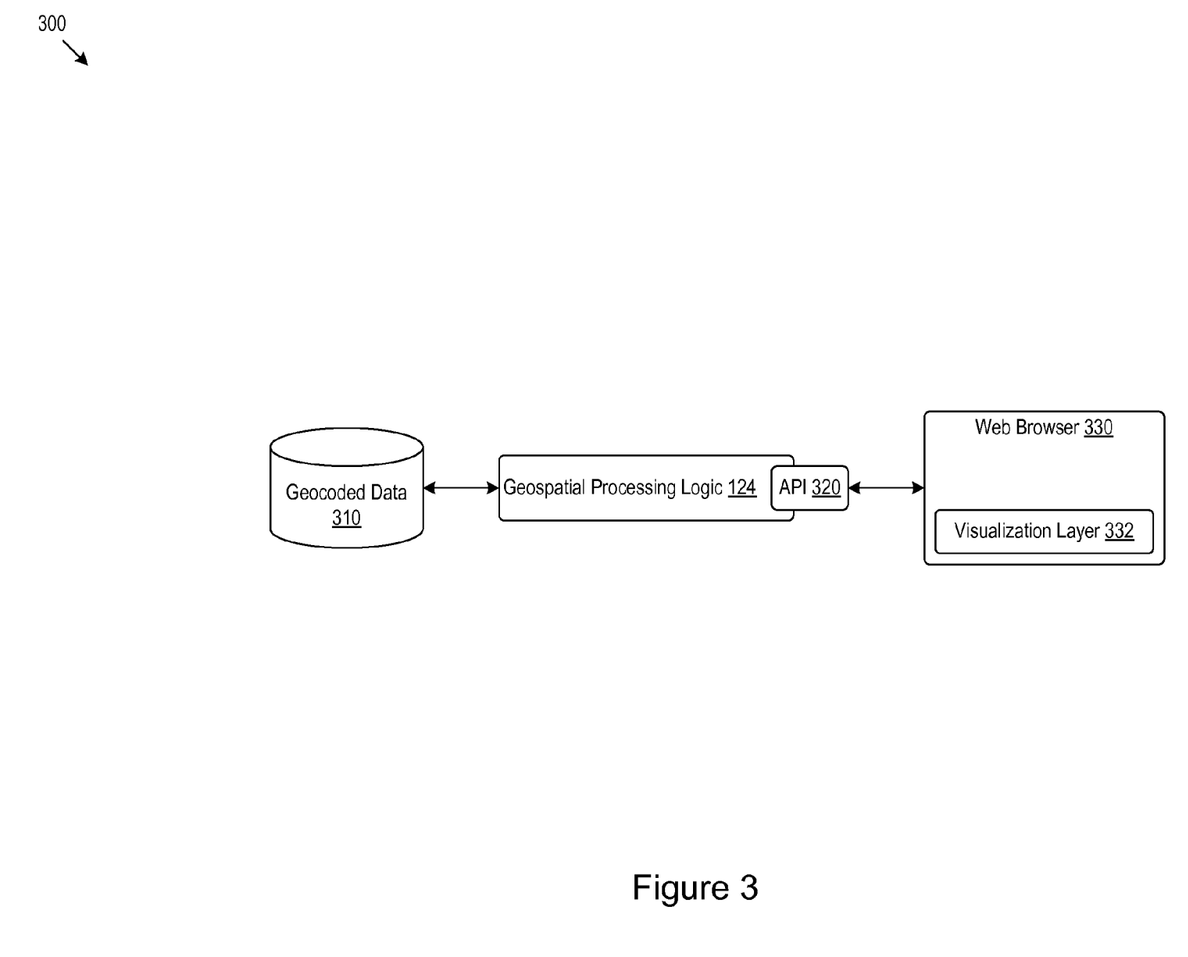
FIG. 3 shows an example of a system for processing geocoded data.

FIG. 3 shows an example of a system 300 for processing geocoded data. The system 300 may support processing and presentation of geocoded data in web applications. The system 300 includes a database 310 storing geocoded data, geospatial processing logic 124, and application program interface (API) 320, a web browser 330 and a visualization layer 332. The geospatial processing logic 124 may access and process geocoded data from the database 310 according to any of methods and techniques discussed above.

The geospatial processing logic 124 may interface with the web browser (including the visualization layer 332) through the API 320. The visualization layer 332 may include any display logic for present or displaying geocoded data, e.g., smoothed geocoded data from the geospatial processing logic 124. The visualization layer 332 may support toggling between different types of data, levels of smoothing, viewing windows (e.g., adjusting areas of focus), or any other display or processing parameters. The visualization layer 332 may obtain any toggle indications from a user and communicate the toggle indications to the geospatial processing logic 124, e.g., as updated operational parameters 134. In response, the geospatial processing logic 124 may dynamically access and process geocoded data according to the toggle indications/updated operational parameters 134.

Figure 4:
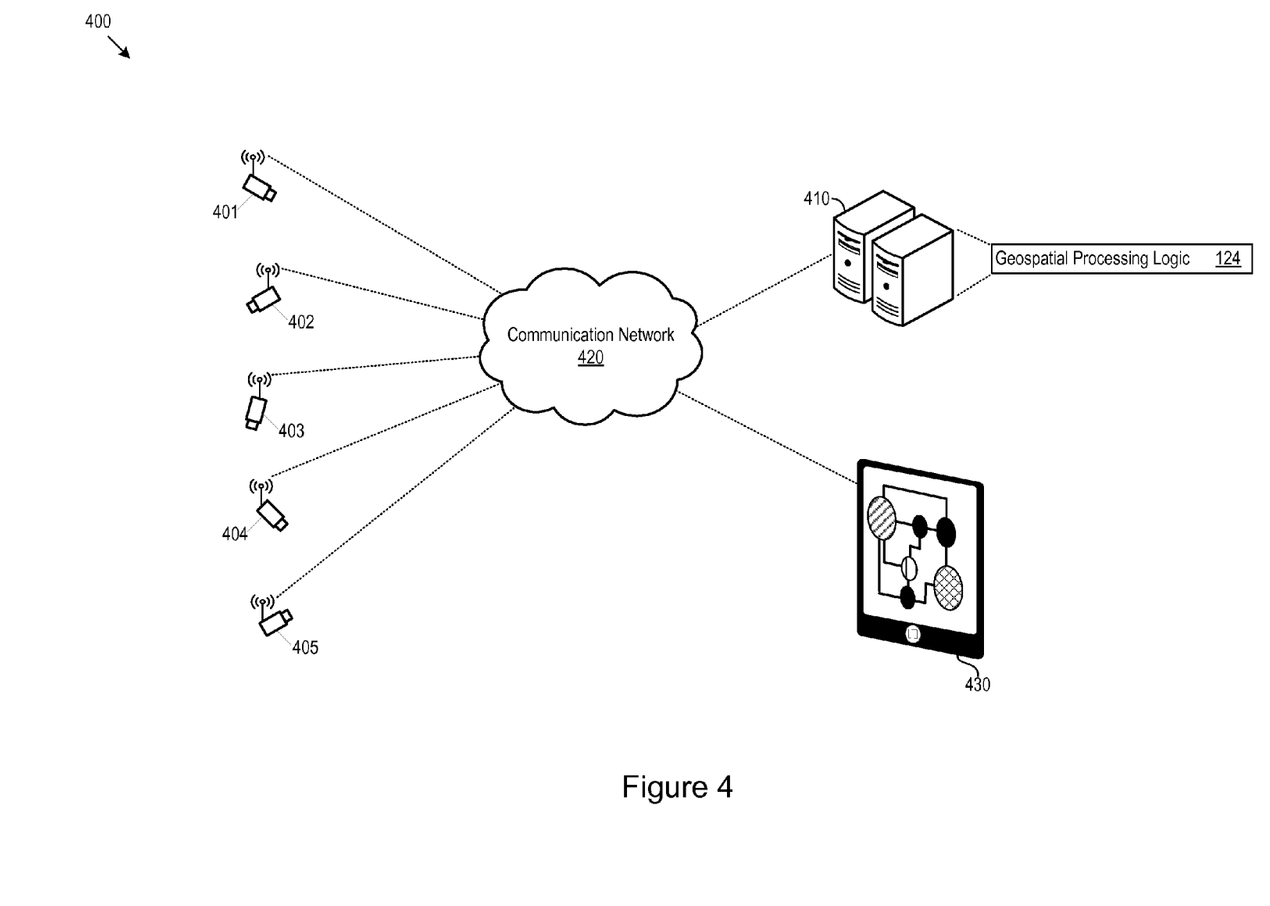
FIG. 4 shows an example of a system for capturing, processing, or visualizing geocoded data.

FIG. 4 shows an example of a system 400 for capturing, processing, or visualizing geocoded data. The system 400 may include one or more data capture devices, such as the capture devices labeled as 401-405 in FIG. 4. The capture devices may take any number of forms, and vary depending on the type of data sensed or captured by the capture device. In that regard, the capture devices may include data capture capabilities for capturing image or video data, audio data, parameter or value measurements of any sort (e.g., power wattage, traffic levels, cellular traffic, etc.), or capturing any other quantifiable data. In FIG. 4, the capture devices 401-405 include cameras that visually capture data, though the capture devices 401-405 may be capable of additional or alternative forms of data capture. In some variations, the data captured by the capture devices includes location data, and may thus be characterized as geocoded data. In other variations, the capture device may associate location data with the captured data, e.g., based on the position of the capture device itself (e.g., obtained from GPS circuitry within the capture device) or location associated with the captured data. In this way, the capture devices may obtain geocoded data.

The capture devices 401-405 may be communicatively linked to a processing server 410 that includes geospatial processing logic 124. In FIG. 4, the capture devices 401-405 wirelessly communicate with the processing server 410 through the communication network 420, though any combination of wired and/or wireless communications and according to any number communication standards, protocols, methods, topologies, or configurations are possible. The processing server 410 may include geospatial processing logic 124 to support accessing and processing (e.g., smoothing) geocoded data in any of the ways described above.

The system 400 shown in FIG. 4 also includes a visualization device 430 may visually display geocoded data. In that regard, the visualization device 430 may be communicatively linked to the processing server 410 or any other source of geocoded data. The visually device 430 may include a user interface for displaying geocoded data, such as smoothed geocoded data processed by the processing server 410, for receiving user inputs which may indicate a specified altering or processing of visualized geocoded data, e.g., via a user input indicating an altered data precision level or viewing window. The visualization device 430 may take any number of forms. In FIG. 4, the visualization device 430 is a tablet device, but the visualization device 430 may be any device that presents geocoded data, for example through a web application. Additional examples include laptop or desktop computers, cellular telephones, personal data assistants (PDAs), e-mail devices, digital music devices, televisions, monitors, display screens, etc. Thus, the visualization device 430 may present multiple views, perspectives, or aspects of geocoded data, which may be supported through efficient, real-time processing of geocoded data by the processing server 410 using the geospatial processing logic 124 to support accessing and processing (e.g., smoothing) geocoded data in any of the ways described above.

The efficient processing of geocoded data by the processing server 410 may allow for technical responses to processed or visualized geocoded data. Some examples are presented next in the context of the exemplary system 400, though the data capture, processing, and technical response techniques may be consistently implemented in other forms as well.

As a first example, the system 400 may support the capture, processing, visualization of vehicle traffic data and associated technical responses. The capture devices 401-405 may be traffic cameras or sensors positioned at various selected points in a city street system. As one example, the capture devices 401-405 may be positioned at traffic signals within a predetermined area of a city. In that regard, the devices 401-405 may capture quantifiable traffic data at respective positions the capture devices 401-405 are positioned, such as number of collisions, length of time of traffic signaling states (e.g., red, green, or yellow lighting durations), number of vehicles that pass through an intersection in total or by a particular direction, number of pedestrians passing through the intersection, and more. The captured data may be appended with geo-location data representative of the acquisition camera or sensor locations to form the geocoded data, as well as undergo further processing to form precise quantitative data representative of the captured physical, real-world events for further analysis.

The processing server 410 may aggregate geocoded vehicle traffic data of a particular type, e.g., number of vehicles passing through intersections over a predetermined period of time. Visualization of the geocoded data may support one or more technical responses, whether user-based or automatic. For example, a traffic manager may view and visualized geocoded traffic data for within a particular region of a city and adjust one or more traffic signal operational parameters at particular signals in the viewed intersections, e.g., increasing or decreasing the length of a signaling at a particular signal (e.g., increasing or decreasing red or green light length). Such technical responses may also be automated, for example by an analysis system monitoring the geocoded vehicle traffic data, and the automated system may effectuate the operational parameter changes in response to analyzing the processed geocoded data. Similar technical responses may be made for any visualized or analyzed type of geocoded vehicle traffic data As a second example, the system 400 may support the capture, processing, visualization of telecommunications data and associated technical responses. The capture devices 401-405 may, for example, be base stations of a cellular network that may capture quantifiable telecommunications data at the respective positions the capture devices 401-405 are positioned. Examples of such captured data may include tower strength, reception quality, number of connected users, congestion level, any sort of usage data, number of connected or dropped calls, and more. Data captured by a particular base station may be associated with the location of the base station, thus forming geocoded data. As another example, the capture devices 401-405 may be the mobile telephones themselves, and the capture devices 401-405 may capture and transmit telecommunications data associated with the particular mobile telephone with corresponding location data (e.g., GPS position of the particular mobile telephone).

The processing server 410 may aggregate geocoded telecommunications data of a particular type, e.g., number of dropped calls, map the aggregated geocoded telecommunications data unto an area map or vector of interest, and process the aggregated geocoded data. A network administrator may view visualized geocoded data for congestion levels amongst base stations in a particular geographical area, and adjust one or more network operational parameters, e.g., by increasing or decreasing capability of one or more base stations, activating or deactivating a base station when the congestion level passes a threshold, and more. Such technical responses may also be automated, for example by an analysis system monitoring the geocoded data. The automated analysis system may effectuate any number of technical responses for any visualized or analyzed type of geocoded telecommunications data.

As a third example, the system 400 may support the capture, processing, visualization of energy data and associated technical responses. The capture devices 401-405 may be power meters or sensors positioned at various points in a geographical area, e.g., at each home, building or residence. The devices 401-405 may, for example, capture quantifiable energy or power consumption at the respective positions the capture devices 401-405 are positioned at, including as examples, instantaneous power consumption, maximum or minimum power consumption over a predetermined period of time, total energy consumed, and more.

In this example, the processing server 410 may aggregate geocoded energy data of a particular type, e.g., total energy consumption, and generate a corresponding area map or vector of interest for processing of the geocoded data. An analysis system may analyze the geocoded energy data and adjust one or more energy operational parameters, e.g., by diverting energy supply to a portion of a power grid that consumes increased amounts of energy, initiating a billing process when threshold amounts of energy are consumed by one or more meters, identify outage conditions and activate backup or reserve energy sources, and more. An automated analysis system may effectuate any number of technical responses for any visualized or analyzed type of geocoded energy data.

While some exemplary environments where the geospatial processing logic 124 may process geocoded data have been presented, any number of other uses and environments are contemplated. As described above, the geospatial processing logic 124 may provide efficient and effective processing of geocoded to support real-time data presentation for time-critical displays, where processing latency that exceeds a particular threshold (e.g., 2 s) will render data less valuable or useless. In that regard, the geospatial processing logic 124 may provide real, valuable insight in real-time and effectuate any number of technical response that may vary depending on the particular environment the geospatial processing logic 124 is implemented in.

The methods, devices, systems, circuitry, and logic described above, including the geospatial processing logic 124, may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the systems and methods have been described, it will be apparent to those of ordinary skill in the art that many more embodiments and implementations are possible within the scope of the systems and methods.

What is claimed is:

1. A system comprising:
 a memory storing geocoded data of objects or signals moving between geolocations;
 a display; and
 circuitry in communication with the memory and the display, the circuitry configured to:
  receive a request from a user to change a set of operational parameters associated with a presentation of the geocoded data;
  access the geocoded data from the memory; and
  in response to the request and in real-time:
   determine an area according to the request;
   obtain a data precision level for processing the geocoded data according to the changed set of operational parameters;
   divide the area into predetermined multiple contiguous regions according to the data precision level;
   aggregate multiple data items of a same type among the geocoded data within each of the multiple contiguous regions and transform the aggregated data items into a single aggregated geocoded data item representing each of the multiple contiguous regions;
   process the single aggregated geocoded data items of the multiple contiguous regions by:
    generating a two-dimensional area map of the multiple contiguous regions according to the data precision level;

joining the single aggregated geocoded data items of the multiple contiguous regions to the area map to obtain a populated area map;
generating a matrix having a number of rows and number of columns each equal to a number of the multiple contiguous regions in the area map;
populating the matrix to generate a smoothing matrix for the single aggregated geocoded data items of the multiple contiguous regions; and
applying the smoothing matrix to the single aggregated geocoded data items of the multiple contiguous regions in the populated area map; and
cause the display to present the processed single aggregated geocoded data items of the multiple contiguous regions.

2. The system of claim 1, where the circuitry is further configured to process the single aggregated geocoded data items of the multiple contiguous regions by:
ensuring the populated area map includes a value for each region in the populated area map.

3. The system of claim 2, where the circuitry is configured to ensure the populated area map includes a value for each region in the populated area map by:
identifying a particular region in the populated area map without an associated value; and
populating the particular region with a zero value.

4. The system of claim 1, where the circuitry is configured to populate the matrix further according to one or more smoothing parameters.

5. The system of claim 1, where the circuitry is configured to access the geocoded data by accessing a specific portion of the geocoded data corresponding to one or more display parameters; and
where the display parameters comprise a user specified display parameter, a preconfigured display parameter, or both.

6. The system of claim 1, where the circuitry is configured to process the single aggregated geocoded data items of the multiple contiguous regions by:
extracting a vector of interest from the area map according to the changed set of operational parameters; and
where the circuitry is configured to apply the smoothing matrix to the area map by applying the smoothing matrix to the vector of interest.

7. The system of claim 6, where the circuitry is configured to apply the smoothing matrix to the vector of interest by performing a matrix multiplication operation with the vector of interest and the smoothing matrix.

8. The system of claim 1, where the circuitry is configured to process the geocoded data items according to the data precision level by generating the area map and the matrix with a same order.

9. The system of claim 1, wherein the smoothing matrix is generated based on smoothing parameters including a smoothing order indicating a number of neighboring locations to account for and configurable weights for neighboring locations for smoothing.

10. The system of claim 1, wherein geolocations of the objects or signals associated with the geocoded data are captured using distributed cameras and sensors.

11. A method comprising:
receiving a request from a user to change a set of operational parameters associated with a presentation of geocoded data of objects or signals moving between geolocations;
accessing the geocoded data from a memory; and
in response to the request and in real-time:
determining an area according to the request;
obtaining a data precision level for processing the geocoded data according to the changed set of operational parameters;
dividing the area into predetermined multiple contiguous regions according to the data precision level;
aggregating multiple data items of a same type among the geocoded data within each of the multiple contiguous regions and transform the aggregated data items into a single aggregated geocoded data item representing each of the multiple contiguous regions;
processing, with circuitry comprising a processor, the single aggregated geocoded data items of the multiple contiguous regions by:
generating, with the processor, a two-dimensional area map of the multiple contiguous regions according to the data precision level;
joining, with the processor, the single aggregated geocoded data items of the multiple contiguous regions to the area map to obtain a populated area map;
generating, with the processor, a matrix having a number of rows and number of columns each equal to a number of the multiple contiguous regions in the area map;
populating, with the processor, the matrix to generate a smoothing matrix for the single aggregated geocoded data items of the multiple contiguous regions; and
applying, with the processor, the smoothing matrix to the single aggregated geocoded data items of the multiple contiguous regions in the populated area map; and
presenting the processed single aggregated geocoded data items of the multiple contiguous regions for display on an output device.

12. The method of claim 11, where processing the single aggregated geocoded data of the multiple contiguous regions with the circuitry further comprises:
ensuring, with the processor, the populated area map includes a value for each region in the populated area map.

13. The method of claim 12, where ensuring the populated area map includes a value for each region in the populated area map comprises:
identifying, with the processor, a particular region in the populated area map without an associated value; and
populating, with the processor, the particular region with a zero value.

14. The method of claim 11, where accessing geocoded data comprises accessing, with the processor, a specific portion of the geocoded data corresponding to one or more display parameters; and
where the display parameters comprise a user specified display parameter, a preconfigured display parameter, or both.

15. The method of claim 11, where generating the area map comprises representing, with the processor, the area map as a vector of interest; and
where applying the smoothing matrix to the area map comprises applying, with the processor, the smoothing matrix to the vector of interest.

16. A product comprising:
a non-transitory computer readable medium comprising instructions, that when executed by a processor, cause the processor to:

receive a request from a user to change a set of operational parameters associated with a presentation of geocoded data of objects or signals moving between geolocations;
access the geocoded data; and
in response to the request and in real time:
  determine an area according to the request;
  obtain a data precision level for processing the geocoded data according to the changed set of operational parameters;
  divide the area into predetermined multiple contiguous regions according to the data precision level;
  aggregate multiple data items of a same type among the geocoded data within each of the contiguous regions and transform the aggregated data items into a single aggregated geocoded data item representing each of the multiple contiguous regions;
  process the single aggregated geocoded data items of the multiple contiguous regions by:
    generating a two-dimensional area map of the multiple regions according to the data precision level;
    joining the single aggregated geocoded data items of the multiple contiguous regions to the area map to obtain a populated area map;
    generating a matrix having a number of rows and number of columns each equal to a number of the multiple contiguous regions in the area map;
    populating the matrix to generate a smoothing matrix for the single aggregated geocoded data items of the multiple contiguous regions; and
    applying the smoothing matrix to the single aggregated geocoded data items of the multiple contiguous regions in the populated area map; and
    cause display of the processed single aggregated geocoded data items of the multiple contiguous regions.

17. The product of claim 16, where the instructions further cause the processor to process the single geocoded data items of the multiple contiguous regions by:
  ensuring the populated area map includes a value for each region in the populated area map, including:
    identifying a particular region in the populated area map without an associated value; and
    populating the particular region with a zero value.

18. The product of claim 16, where the instructions cause the processor to access the geocoded data by accessing a specific portion of the geocoded data corresponding to one or more display parameters; and
  where the display parameters comprise a user specified display parameter, a preconfigured display parameter, or both.

19. The product of claim 16, where the instructions further cause the processor to process the single aggregated geocoded data items of the multiple contiguous regions according to the data precision level by:
  extracting a vector of interest from the area map according to the changed set of operation parameters; and
  where applying the matrix to the area map comprises applying the matrix to the vector of interest.

* * * * *